United States Patent [19]

Kolling et al.

[11] 4,445,623

[45] May 1, 1984

[54] MOLDED TRASH CONTAINER COVER

[76] Inventors: Byron M. Kolling, 23W040 Seneva Rd.; Jack Bergbreiter, 410 Evergreen Ave., both of Glen Ellyn, Ill. 60137; Roy Hunn, 21W179 Woodview, Itasca, Ill. 60143

[21] Appl. No.: 430,278

[22] Filed: Sep. 30, 1982

[51] Int. Cl.³ .................. B65D 43/14; B65D 51/04
[52] U.S. Cl. ................................. 220/343; 220/1 T
[58] Field of Search .................. 220/1 T, 334, 343

[56] References Cited

U.S. PATENT DOCUMENTS 4,342,402  8/1982  Junghes .............................. 220/1 T Primary Examiner—George T. Hall
Attorney, Agent, or Firm—Leydig, Voit, Osann, Mayer & Holt, Ltd.

[57] ABSTRACT

A rotationally molded, one-piece plastic trash container cover having peripheral flanges, stiffening ribs and cylindrical bosses defining reinforced hinges, in which the plastic is high density, cross-linked polyethylene.

3 Claims, 5 Drawing Figures

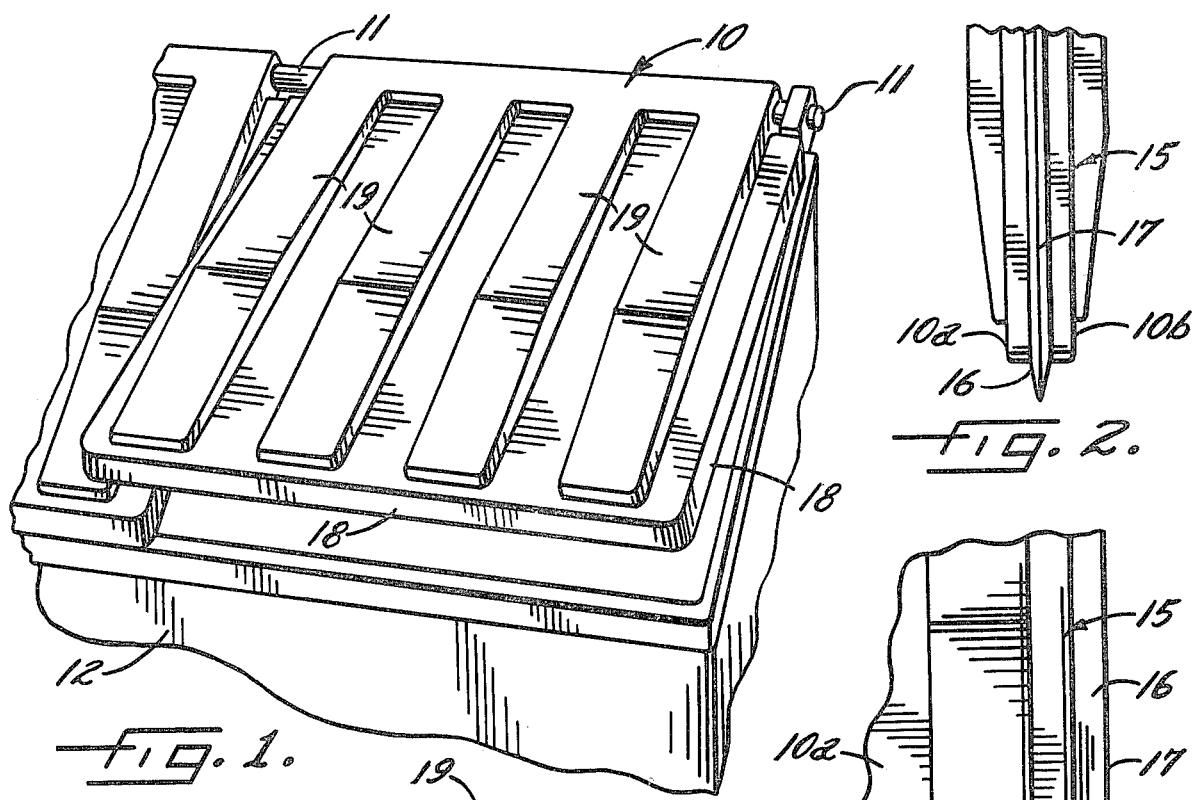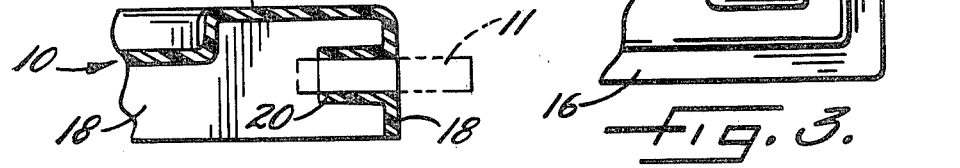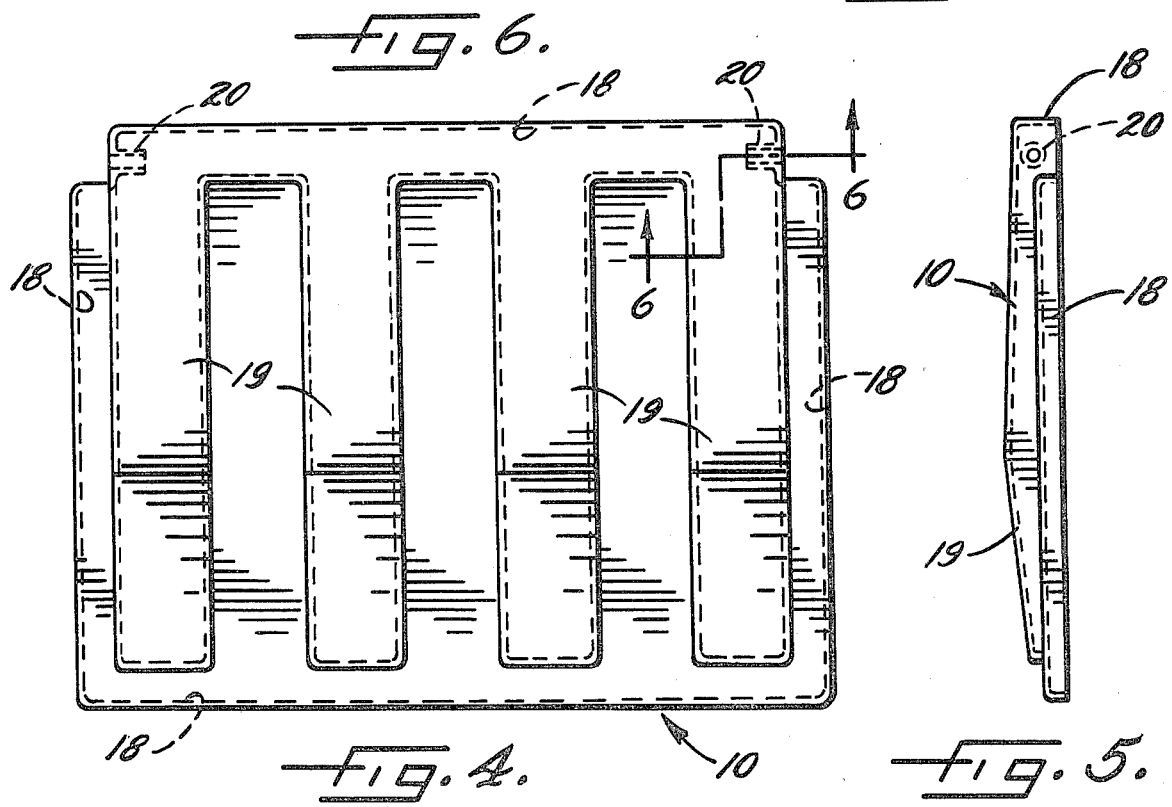

MOLDED TRASH CONTAINER COVER

This invention relates generally to covers for large trash containers and more particularly concerns a molded plastic cover for such purposes.

Large trash containers such as rear and front loaders are often provided with hinged covers which can be raised to recieve trash and which typically fall open when the container is dumped by being lifted and overturned by a refuse truck. Covers made of steel are heavy, require maintenance and, perhaps surprisingly to those not familiar with the industry, have poor service lives. Such covers are subjected to extremely rough usage.

Covers have been made of aluminum, but that has not proven satisfactory. The initial cost is high, and with the recent emphasis on reclaiming aluminum, they are subject to theft.

The primary aim of the present invention is to provide a container cover of exceptional durability, capable of outlasting steel and aluminum covers, by molding the cover in a suitable form of a plastic having suitable properties.

A related object is to provide such a cover in one piece form which is maintenance-free. Another object is to provide a cover of the foregoing type which is relatively light in weight despite being of the required large size; which means the cover is easy to manipulate, quiet in that it will not slam open or shut as will a heavy cover, and safe since the danger of a heavy cover falling against a person is eliminated.

Other objects and advantages of the invention will become apparent upon reading the following detailed description and upon reference to the drawings, in which:

FIG. 1 is a fragmentary perspective of a trash container having a cover embodying the invention;

FIG. 2 is a fragmentary elevation of the molded part from which the cover of FIG. 1 is made;

FIG. 3 is a fragmentary plan of the part of FIG. 2;

FIG. 4 is a plan of the cover shown in FIG. 1;

FIG. 5 is an elevation of the cover shown in FIG. 4; and

FIG. 6 is a fragmentary section taken approximately along the line 6—6 of FIG. 4.

While the invention will be described in connection with a preferred embodiment and procedure, it will be understood that we do not intend to limit the invention to that embodiment or procedure. On the contrary, we intend to cover all alternatives, modifications and equivalents as may be included within the spirit and scope of the invention as defined by the appended claims.

Turning to the drawing, there is shown in FIG. 1 a container cover 10 embodying the invention hinged on a hinge rod 11 to the top of a trash container 12. The cover 10 is rotationally molded and hence is a sheet of substantially uniform thickness, in this case about ⅛" to 3/16", having a configuration imposed by the mold.

A rotational mold is typically a rigid container having an inner shape defining the configuration desired for one side of the product. Plastic resin powder or pellets are placed in the mold, the mold is heated above the resin melting temperature, and the mold is rotated so that centrifugal forces causes a substantially uniform layer of plastic to flow over the inner mold shape. As is conventional, the cover 10 is molded in pairs 10a and 10b (FIGS. 2 and 3) within two identical molds fitted together to form the mold container, resulting in the production of a hollow part 15 formed of two mirror image covers 10a, 10b having flanges 16 joined at a line 17 which was the parting line of the mold. A saw is used to cut the covers 10a, 10 b from the flanges 16 so as to form two covers 10.

In carrying out the invention, the cover 10 is shaped to have peripheral side flanges 18 to stiffen the outer shape of the cover, a plurality of ribs 19 spaced across the body to stiffen the cover into a substantially planar configuration, and a pair of cylindrical aligned bosses 20 formed in two of the flanges 18 near one edge of the cover body to receive the hinge rod 11 and serve as reinforced hinges (see FIGS. 4–6). The flanges 18 and ribs 19 are formed by shaping the mold in which the cover is molded. The bosses 20 are formed by inserting short lengths of tubing through the mold blow holes. During the molding process, the molten resin builds up around the tubing to form the integral bosses 20. When the mold is set to allow the molded part to cure, the tubes serve as blow hole passages connecting the interior of the part to the surrounding atmosphere so that gas pressures can be equalized.

In keeping with the invention, the preferred plastic resin is high density, cross-linked polyethylene which becomes cross-linked during the curing stage of the molding process. Commercially, such material is available from Phillips Chemical Company under the trade name Marlex CL-100, and it and the parameters for molding the material are disclosed in U.S. Pat. to Rees et al. No. 4,029,729 on Rotational Molding and Composition Therefor, issued June 14, 1977. With this material, a steel mold and brass or nylon tubing are suitable to avoid sticking problems during the molding process.

The molded polyethylene, once it becomes cross-linked, becomes an extremely durable material through wide temperature ranges. In this application, the material easily outlasts steel or aluminum. The cover 10 is essentially maintenance-free since no painting is required and the color is molded in during the forming process.

Because the plastic is light in weight, even large covers become easy to manipulate and, even if they are allowed to freely drop, there is little noise generated as is the case with heavy metal covers. Another aspect of considerable importance is the safety factor since the use of a plastic cover eliminates the possibility of a heavy metal cover falling to severly injure a person.

The possibility of initiating a tearing failure by passing the hinge rod 11 through simple holes in the flange 18, and thus generating a stress concentration at the holes, is avoided by integrally molding in the bosses 20 which greatly reinforces the areas of the cover which are most likely subject to damaging forces.

We claim as our invention:

1. A container cover comprising a one-piece body formed of plastic and shaped to have peripheral side flanges to stiffen the outer shape of the cover, said cover also having a plurality of rigs spaced across the body to stiffen the cover into a substantially planar configuration, and said cover having a pair of cylindrical aligned bosses in two of said flanges near one edge of said body adapted to receive a hinge rod and thus serve as reinforced hinges for the cover.

2. The cover of claim 1 in which the body has been rotationally molded and, except for said bosses, is a sheet of substantially uniform thickness molded into said flanges and ribs.

3. The cover of claim 2 in which the plastic is a high density cross-linked polyethylene.

* * * * *